Patented Apr. 8, 1941

2,237,885

UNITED STATES PATENT OFFICE 2,237,885

STABLE DIAZO COMPOUNDS

Eugene A. Markush, Jersey City, and Mark S. Mayzner, Asbury Park, N. J., assignors to Pharma Chemical Corporation, New York, N. Y., a corporation of New York No Drawing. Application April 13, 1938, Serial No. 201,676

10 Claims. (Cl. 260—142)

Our invention relates to stable diazo compounds and refers particularly to stable diazo zinc compounds formed by combining a diazonium with zinc salts of aryl sulfo-carboxylic acids or zinc salts of aryldisulfonic acids.

Our invention includes both unsubstituted and substituted diazotized aromatic amines, it having been found that where such diazoniums are added to the zinc salts of sulfo-carboxy acids of the benzene and naphthalene series, the free bond of the —N=N— group will combine with the sulfo-acid group, thus leaving the carboxy acid group open to form a double salt with zinc.

It has further been found that if a diazonium as described above is added to the zinc salts of disulfonic acids of the benzene and naphthalene series, a free bond of the —N=N— group will combine with one sulfo acid group, thus leaving the other sulfo acid group open to form a salt with zinc.

These compounds are exceedingly stable, well soluble in water and quite stable in aqueous solutions, and possess the remarkable property that by contact with coupling components the original diazonium combines with the coupling component to form insoluble dyes, or colors.

In the application of our new stable diazo compounds, the coupling component is applied to the cellulosic fiber or fabric by any of the well known methods, the impregnated material is dried, and one of our stabilized diazo compounds is applied thereto, usually in the form of a printing paste, whereupon the stabilized diazonium couples with the coupling component forming an insoluble color upon the celulosic material, and the material is then dried and finished by any of the usual treatments.

It will thus be seen that our invention is directed to the production of new stabilized diazoniums having the property of forming insoluble colored compounds with coupling components.

We give the following as examples of our invention:

Example I 19.8 parts 2.5 dichloraniline hydrochloride are introduced into 30 parts muriatic acid and 36 parts of ice. The suspension is diazotized in the usual manner with a solution of 7 parts sodium nitrite. The resulting solution is filtered and neutralized and 25 parts of para-benzol-sulfo-carboxylic acid zinc salt are added either as fine powder or as a suspension in water. After a short time new crystals separate which are filtered. The filter cake is washed with alcohol and ether and then dried at room temperature.

The formula of the thus produced compound is as follows:

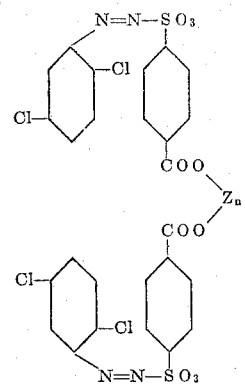

Example II 30.4 parts of 4-nitro-o-toluidine are introduced into 60 parts water and 25 parts by volume of muriatic acid. The whole heated to 90° C., when a second portion of 25 parts by volume muriatic acid is introduced. The whole is cooled to below 0° C., when a solution of 14 parts of sodium nitrite in 50 parts water is added. The resulting solution is filtered, partially neutralized and 60 parts of meta-benzol-disulfonic acid zinc salt are added. The new product precipitates and is filtered. The filter cake can be dried at low temperature without decomposition.

The formula of the thus produced compound is

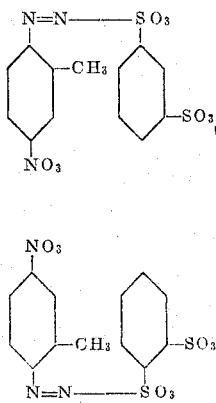

Example III 34 parts 4-nitro-o-anisidine are introduced into 60 parts water and 29 parts muriatic acid. The whole heated to 90° C., when the second portion of 29 parts muriatic acid is added. The whole cooled to below 0° C., when a solution of 14 parts sodium nitrite in 50 parts water is added. The resulting solution is filered and neutralized and 62 parts of 1-nitro-2-carboxy-5-sulfo-benzol zinc salt are added, either in solid form, or as a suspension or then as a concentrated solution. The precipitate of the double zinc salt is filtered and dried at room temperature.

*Example IV*

16.8 parts of 5-nitro-o-anisidine are suspended in 50 parts water and 30 parts muriatic acid and at 5° C., introduce quickly a solution of 7 parts nitrite in 20 parts water. After stirring for some time the diazo solution is filtered to it and added 26 parts zinc salt of para sulfo benzoic acid. The product thus formed is precipitated and filtered. The filtered cake is dried at 30° C.

*Example V*

14.1 parts of 4-chlor-toluidine are diazotized in the usual manner with 7 parts nitrite. To the filtered diazo solution are added 35 parts of dizinc salt of 1.5 naphthaline disulphonic acid. The double zinc salt thus formed is filtered and dried below 40° C.

Among the amines suitable for azotization in our process are the following:

Dianisidine
Benzidine
Tolidine
4-chloro-2-amino-1-methoxy-benzene
2.5-dichlor-1-methyl-4-aminobenzene
5-nitro-2-amino-1-methylbenzene
3-chloro-1-aminobenzene
2-amino-4-methoxy-5-benzoylamino-1-chlorobenzene
2.5-dichloro-4-amino-1-methylbenzene
4.6-dichlor-2-amino-1-methylbenzene
4-nitro-2-amino-1-methoxybenzene
4-amino-1.3-dimethylbenzene
4.5-dichloro-2-amino-1-methylbenzene
5-nitro-2-amino-1-methoxybenzene
3-amino-4-methoxy-6-nitro-1-methylbenzene
3-amino-4-methoxy-6-benzoylamino-1-methylbenzene
6-amino-4-benzoylamino-1.3-dimethoxybenzene
6-amino-4-benzoylamino-1.3-dimethoxy-diphenyl
4.4'-diamino-3.3'-dimethoxybenzene
6-amino-3-benzoylamino-1.4-diethoxybenzene
4-chloro-2-amino-1-methyl-benzene
4-nitro-4'-amino-2'.5'-dimethoxy-azobenzene
3-nitro-4'-amino-2'.5'-dimethoxyazobenzene
4-methyl-4'-amino-2-methoxy-5'-methylazobenzene
o-chloraniline
p-Chloraniline Among the coupling components suitable for use in our process are the following:

Aceto-acetyl-alpha-naphthylamine
Aceto-acetyl-beta-naphthylamine
2'3'hydroxynaphthoic acid-2-naphthylamide
2'3'-hydroxynaphthoic acid-3-chloranilide
2'3'hydroxynaphthoic acid-5-chloro-2-anisidide
2'3'-hydroxynaphthoic acid-3-nitranilide
2.3-hydroxynaphthoyl-meta-toluidine
2.3-hydroxynapthoyl-5-chloro-1.2-anisidine
2.3-hydroxylnaphthoyl-dianisidine
Alpha-hydroxy-naphtho-carbazole-carboxylic acid-5-nitro-o-anisidine
Alpha-hydroxy-naphtho-carbazole-carboxylic acid-xylidine The stable diazoniums produced by the above mentioned examples may be standardized to definite strength by any of the known agents as: Aluminum sulfate, $Al_2(SO_4)_3$, $18H_2O$; sodium sulfate $Na_2SO_4$, magnesium sulfate, $MgSO_4.7H_2O$ etc. These agents may be used individually or in combination with each other, as for instance $Na_2SO_4$ may be used with $Al_2(SO_4)_3$, $18H_2O$.

We do not limit ourselves to the particular chemicals, quantities, times, temperatures or steps of process specifically mentioned as these are given solely for the purpose of clearly describing our invention.

What we claim is:

1. The process of forming stable diazoniums having the formula:

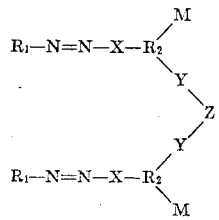

in which $R_1$ is the residue of an aryl compound of the group consisting of the benzene and naphthalene series in which the substitutions may be halogen, nitro, methoxy, ethoxy, methyl or ethyl; X is the acid residue $—SO_3—$; $R_2$ is a member of the group consisting of benzene and naphthalene series; M may be hydrogen, nitro, sulfo or chlor; Y is a sulfo acid group or a carboxy acid group, and Z is zinc; which consists in adding a diazonium member of the group consisting of benzene and naphthalene series to the zinc salts of the sulfo-carboxylic acids or the disulfo acids of the group consisting of the benzene and naphthalene series.

2. A stable diazonium having the formula:

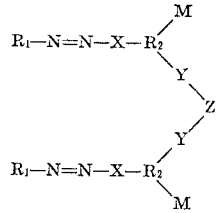

in which $R_1$ is the residue of an aryl compound of the group consisting of the benzene and naphthalene series in which the substitutions may be halogen, nitro, methoxy, ethoxy, methyl or ethyl; X is the acid residue $—SO_3—$; $R_2$ is a member of the group consisting of benzene and naphthalene; M may be hydrogen, nitro, sulfo or chlor; Y is a sulfo acid group or a carboxy acid group, and Z is zinc.

3. A stable diazonium salt comprising a diazotized benzene compound combined with a member of the group consisting of compounds of the zinc salts of the sulfo carboxylic acids and the disulfonic acids of the benzene and naphthalene series, in which a member of the group consisting of sulfo acids and carboxy acids is combined with zinc, which compounds are soluble in water and capable of combining with coupling components.

4. The stable diazonium salt comprising a diazotized naphthalene compound combined with a member of the group consisting of compounds of the zinc salts of the sulfo carboxylic acids and the disulfonic acids of the benzene and naphthalene series, in which a member of the group consisting of sulfo acids and carboxy acids is combined with zinc, which compounds are soluble in water and capable of combining with coupling components.

5. The stable diazonium salt comprising a diazotized benzene compound combined with a member of the group consisting of compounds of the zinc salts of the sulfo carboxylic acids and the disulfonic acids of benzene, in which a member of the group consisting of sulfo acids and carboxy acids is combined with zinc, which compounds are soluble in water and capable of combining with coupling components.

6. The stable diazonium salt comprising a diazotized benzene compound combined with a member of the group consisting of compounds of the zinc salts of the sulfo carboxylic acids and the disulfonic acids of naphthalene series, in which a member of the group consisting of sulfo acids and carboxy acids is combined with zinc, which compounds are soluble in water and capable of combining with coupling components.

7. The stable diazonium salt comprising a diazotized naphthalene compound combined with a member of the group consisting of compounds of the zinc salts of the sulfo carboxylic acids and the disulfonic acids of benzene, in which a member of the group consisting of sulfo acids and carboxy acids is combined with zinc, which compounds are soluble in water and capable of combining with coupling components.

8. The stable diazonium salt comprising a diazotized naphthalene compound combined with a member of the group consisting of compounds of the zinc salts of the sulfo carboxylic acids and the disulfonic acids of naphthalene series, in which a member of the group consisting of sulfo acids and carboxy acids is combined with zinc, which compounds are soluble in water and capable of combining with coupling components.

9. A stable diazonium salt compound comprising diazotized dichloraniline combined with a zinc salt of a naphthalene disulfonic acid.

10. A stable diazonium salt compound comprising diazotized dichloraniline combined with the zinc salt of 1:5 naphthalene disulfonic acid.

EUGENE A. MARKUSH.
MARK S. MAYZNER.